(12) United States Patent
Veilleux, Jr. et al.

(10) Patent No.: US 11,203,440 B2
(45) Date of Patent: Dec. 21, 2021

(54) SYSTEM FOR INTEGRATED ENGINE AND FLIGHT CONTROL

(71) Applicant: HAMILTON SUNDSTRAND CORPORATION, Charlotte, NC (US)

(72) Inventors: Leo J. Veilleux, Jr., Wethersfield, CT (US); Richard A. Poisson, Avon, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 112 days.

(21) Appl. No.: 15/862,305

(22) Filed: Jan. 4, 2018

(65) Prior Publication Data
US 2019/0202575 A1 Jul. 4, 2019

(51) Int. Cl.
| | |
|---|---|
| *B64D 31/14* | (2006.01) |
| *G05B 23/02* | (2006.01) |
| *B64C 13/50* | (2006.01) |
| *B64D 31/06* | (2006.01) |
| *G05D 1/00* | (2006.01) |
| *G05B 15/02* | (2006.01) |

(52) U.S. Cl.
CPC .............. *B64D 31/14* (2013.01); *B64C 13/50* (2013.01); *B64D 31/06* (2013.01); *G05B 23/0208* (2013.01); *G05D 1/0077* (2013.01); *G05B 15/02* (2013.01)

(58) Field of Classification Search
CPC ........................... B64C 13/50; G05B 23/0208
USPC ............................................................ 701/3
See application file for complete search history.

(56) References Cited

U.S. PATENT DOCUMENTS

| | | | |
|---|---|---|---|
| 7,017,861 B1 * | 3/2006 | Johansson | ................ G05B 9/03 244/194 |
| 8,036,805 B2 | 10/2011 | Mahoney et al. | |
| 8,260,492 B2 | 9/2012 | Stange et al. | |
| 8,301,867 B1 | 10/2012 | Mazuk et al. | |
| 8,606,460 B2 | 12/2013 | Johansson | |
| 8,768,598 B2 | 7/2014 | McCollough | |
| 8,825,227 B2 | 9/2014 | Saint-Marc et al. | |
| 9,145,202 B2 | 9/2015 | Mathews, Jr. et al. | |

(Continued)

FOREIGN PATENT DOCUMENTS

| | | | |
|---|---|---|---|
| CN | 104503467 | | 4/2015 |
| CN | 104503467 A | * | 4/2015 |

OTHER PUBLICATIONS

European Patent Office, European Search Report dated May 13, 2019 in Application No. 19150174.1.

(Continued)

*Primary Examiner* — Maceeh Anwari
(74) *Attorney, Agent, or Firm* — Snell & Wilmer L.L.P.

(57) ABSTRACT

An aircraft control system may include an engine control subsystem, a flight control subsystem, a processor, and a tangible, non-transitory memory. The tangible, non-transitory memory may be configured to communicate with the processor, and the tangible, non-transitory memory may have instructions stored thereon that, in response to execution by the processor, cause the aircraft control system to perform various operations. The various operations may include controlling, by the processor, the engine control subsystem and controlling, by the processor, the flight control subsystem. That is, a single processor (or a single set of processors) may control both the engine control subsystem and the flight control subsystem.

18 Claims, 8 Drawing Sheets

(56) References Cited

U.S. PATENT DOCUMENTS

| | | |
|---|---|---|
| 9,388,744 B2 | 7/2016 | Mathews, Jr. et al. |
| 9,573,682 B2 | 2/2017 | Heusinger et al. |
| 2009/0312892 A1* | 12/2009 | Mahoney .................. F02C 9/28 |
| | | 701/3 |
| 2016/0200421 A1* | 7/2016 | Morrison ............. G05D 1/0077 |
| | | 244/17.23 |

OTHER PUBLICATIONS

European Patent Office, European Office Action dated Jun. 19, 2020 in Application No. 19150174.1.
European Patent Office, European Summons to Attend Oral Proceedings dated Feb. 17, 2021 in Application No.19150174.1.

\* cited by examiner

SYSTEM FOR INTEGRATED ENGINE AND FLIGHT CONTROL

FIELD

The present disclosure relates to aircraft, and more specifically, to aircraft control systems.

BACKGROUND

Aircraft are typically controlled via multiple control architectures. For example, a conventional aircraft may include an engine control controller subsystem for each engine of the aircraft, such as a full authority digital engine control ("FADEC"), and the aircraft may further include a flight controller for controlling avionics of the aircraft. Each of these different control architectures generally has its own processor and memory and each generally executes disparate algorithms and implements different functions. Accordingly, overall control of conventional aircraft is generally achieved via feedback between otherwise independent control subsystems. This feedback between separate control subsystems of a conventional aircraft may be inefficient, thereby inhibiting optimization of aircraft operation.

SUMMARY

In various embodiments, the present disclosure provides an aircraft control system that includes an engine control subsystem, a flight control subsystem, a processor, and a tangible, non-transitory memory. The tangible, non-transitory memory may be configured to communicate with the processor, and the tangible, non-transitory memory may have instructions stored thereon that, in response to execution by the processor, cause the aircraft control system to perform various operations. The various operations may include controlling, by the processor, the engine control subsystem and controlling, by the processor, the flight control subsystem. That is, a single processor (or a single set of processors) may control both the engine control subsystem and the flight control subsystem.

In various embodiments, the engine control subsystem comprises one or more actuators (e.g., one or more engine actuator control electronics), one or more engine remote inputs, and/or one or more engine remote outputs. In various embodiments, the flight control subsystem comprises one or more actuators (e.g., one or more flight actuator control electronics), one or more flight remote inputs, and/or one or more flight remote outputs. In various embodiments, the processor is a first processor and the aircraft control system further includes a second processor and a third processor, wherein the first processor, the second processor, and the third processor are directly interlinked. For example, the first processor may be directly linked to the second processor and may be directly linked to the third processor, with the second processor being directly linked to the third processor.

In various embodiments, wherein the tangible, non-transitory memory is a first tangible, non-transitory memory ("first memory"), wherein the aircraft control system further comprises a second tangible, non-transitory memory ("second memory"), and a third tangible, non-transitory memory ("third memory"), wherein each of the first memory, the second memory, and the third memory is configured to communicate with a respective processor of the first processor, the second processor, and the third processor. In various embodiments, the first memory, the second memory, and the third memory each have instructions stored thereon that, in response to execution by the respective processor, cause the aircraft control system to perform various operations. The various operations include controlling, by the respective processor, the engine control subsystem and controlling, by the respective processor, the flight control subsystem.

In various embodiments, the flight control subsystem comprises a first flight control channel, a second flight control channel, and a third flight control channel. The first flight control channel may be directly linked to the first processor, the second flight control channel may be directly linked to the second processor, and the third flight control channel may be directly linked to the third processor. In various embodiments, the engine control subsystem is directly linked to each of the first processor, the second processor, and the third processor.

In various embodiments, the engine control subsystem is coupled to a first engine and comprises a first engine control channel and a second engine control channel. The first engine control channel is directly linked to a first set of two of the first processor, the second processor, and the third processor and the second engine control channel is directly linked to a second set of two of the first processor, the second processor, and the third processor, wherein the first set is different than the second set, according to various embodiments. In various embodiments, the engine control subsystem is a first engine control subsystem and the aircraft control system further includes a second engine control subsystem coupled to a second engine. The second engine control subsystem comprises a third engine control channel and a fourth engine control channel, according to various embodiments. The third engine control channel is directly linked to a third set of two of the first processor, the second processor, and the third processor and the fourth engine control channel is directly linked to a fourth set of two of the first processor, the second processor, and the third processor, wherein the third set is different than the fourth set, according to various embodiments.

In various embodiments, each of the first engine control channel, the second engine control channel, the third engine control channel, and the fourth engine control channel is directly linked to each of the first processor, the second processor, and the third processor. In various embodiments, the aircraft control system further includes a prognostic health monitor configured to monitor and report health of components of the aircraft control system. In various embodiments, each of the first processor, the second processor, and the third processor comprises multiple cores.

Also disclosed herein, according to various embodiments, is an aircraft that includes a first engine and a second engine. The aircraft also includes a first engine control subsystem coupled to the first engine, according to various embodiments. The first engine control subsystem may include a first engine control channel and a second engine control channel. The aircraft also includes a second engine control subsystem coupled to the second engine, according to various embodiments. The second engine control subsystem may include a third engine control channel and a fourth engine control channel. Still further, the aircraft may include a flight control subsystem comprising a first flight control channel and second flight control channel In various embodiments, the aircraft also includes a first processor, a second processor, and a third processor as well as a first tangible, non-transitory memory, a second tangible, non-transitory memory, and a third tangible, non-transitory memory. Each of the first memory, the second memory, and the third memory is configured to communicate with a respective processor of the first processor, the second processor, and the third processor, according to various embodiments. The first memory, the second memory, and the third memory may each have instructions stored thereon that, in response to execution by the respective processor, cause the aircraft control system to perform various operations. The various operations may include controlling, by the respective processor, the engine control subsystem and controlling, by the respective processor, the flight control subsystem.

Also disclosed herein, according to various embodiments, is an aircraft control system that includes a first engine control subsystem, a second engine control subsystem, and a flight control subsystem. The first engine control subsystem includes a first engine control channel and a second engine control channel, the second engine control subsystem includes a third engine control channel and a fourth engine control channel, and the flight control subsystem includes a first flight control channel, a second flight control channel, and a third flight control channel, according to various embodiments. The aircraft control system may further include a first processor, a second processor, and a third processor as well as a a first tangible, non-transitory memory, a second tangible, non-transitory memory, and a third tangible, non-transitory memory. Each of the first memory, the second memory, and the third memory is configured to communicate with a respective processor of the first processor, the second processor, and the third processor, according to various embodiments. The first memory, the second memory, and the third memory may each have instructions stored thereon that, in response to execution by the respective processor, cause the aircraft control system to perform various operations. The various operations may include controlling, by the respective processor, the engine control subsystem and controlling, by the respective processor, the flight control subsystem. In various embodiments, the first processor is linked to the first engine control subsystem, the second engine control subsystem, and the flight control subsystem via a first hub, the second processor is linked to the first engine control subsystem, the second engine control subsystem, and the flight control subsystem via a second hub, and the third processor is linked to the first engine control subsystem, the second engine control subsystem, and the flight control subsystem via a third hub. In various embodiments, each of the first processor, the second processor, and the third processor is directly linked to each of the first hub, the second hub, and the third hub.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
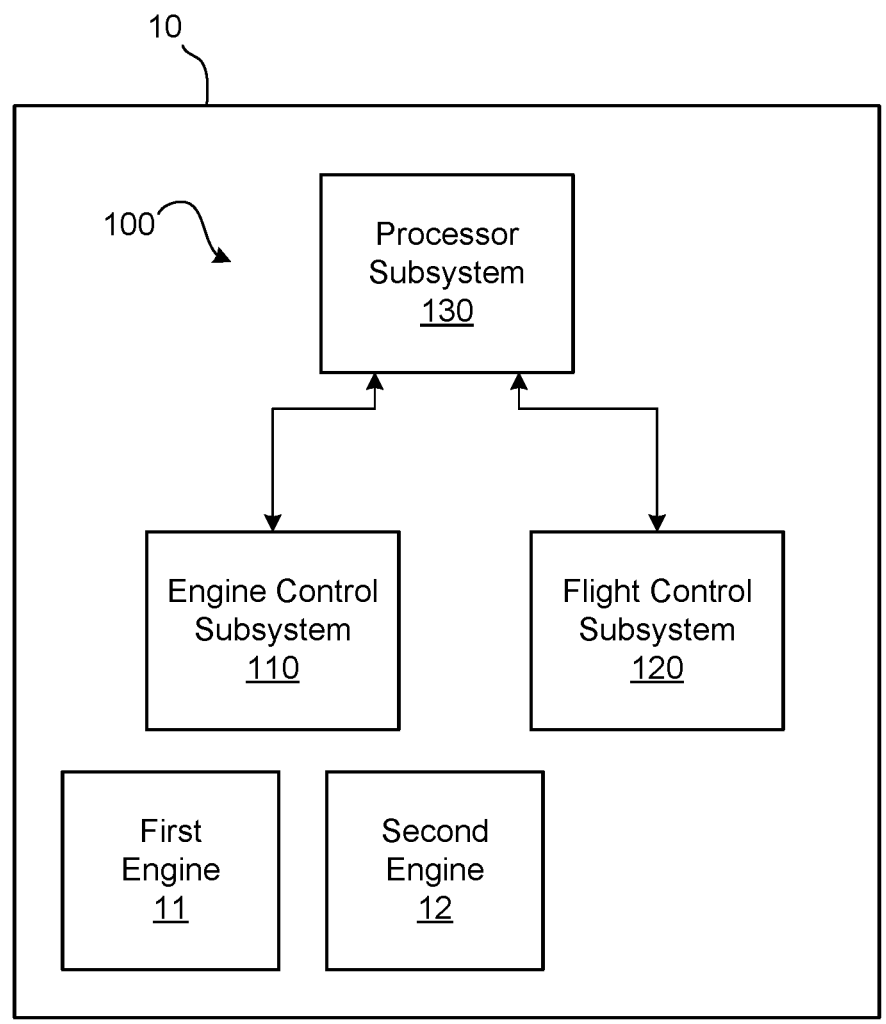
FIG. 1 is a schematic block diagram of an aircraft control system having an engine control subsystem, a flight control subsystem, and a processor, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, and with reference to FIG. 1, an aircraft 10, which is schematically depicted, includes an aircraft control system 100. The aircraft 10 may include a fuselage, wings, landing gear, one or more gas turbine engines (e.g., a first engine 11 and a second engine 12), among other components. As described in greater detail below, the aircraft control system 100 of the aircraft 10 generally includes an engine control subsystem 110, a flight control subsystem 120, and a processor subsystem 130. The processor subsystem 130 includes one or more processors that execute instructions to perform operations to control both the engine control subsystem 110 and the flight control subsystem 120, according to various embodiments. That is, a single processor or a single set of processors that form the processor subsystem 130, which may be separate and/or physically removed a distance from subsystems 110, 130, control both the engine control subsystem 110 and the flight control subsystem 120.

In various embodiments, the engine control subsystem 110 and the flight control subsystem 120 refer generally to the remote inputs, remote outputs, actuators (hydraulic, pneumatic, electromechanical), and other control electronics/devices coupled to respective portions/components of the aircraft 10. That is, the engine control subsystem 110 may include the remote inputs, remote outputs, the actuators, and other control electronics coupled to or in the vicinity of the gas turbine engine(s) 11, 12 of the aircraft 10. In various embodiments, the engine control subsystem 110 may include remote inputs, remote outputs, actuators, and other control electronics of a full authority digital engine control (FADEC), an engine-indicating and crew-alerting system (EICAS), or the like. In various embodiments, the flight control subsystem 120 may include the remote inputs, remote outputs, the actuators, avionics, and other control electronics (e.g., non-engine related) that utilized to affect the flight of the aircraft 10. The processor subsystem 130, as described in greater detail below, generally refers to the one or more processors, which each may have multiple cores and may have high bandwidth/throughput, that execute instructions stored on one or more tangible, non-transitory memory units to control both the engine control subsystem 110 and the flight control subsystem 120.

The processor(s) of the processor subsystem 130 can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the processor can be configured to implement various logical operations in response to execution of instructions, for example, instructions stored on one or more non-transitory, tangible, computer-readable media. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the aircraft control system 100 integrates the execution of the engine control subsystem 110 and the flight control subsystem 120 by a single processor or a single set of processors (processor subsystem 130). In various embodiments, the control of the one or more engine(s) 11, 12 is integrated into the flight control domain while maintaining redundancy and sufficient throughput. With the engine controls and flight controls sharing a common processor (or set of processors), control efficiency is improved, reliability and safety are increased, and the overall aircraft operation may be optimized and enhanced, according to various embodiments. For example, controlling the engine(s) 11, 12 (via engine control subsystem 110) and controlling flight/avionics of the aircraft (via flight control subsystem 120) with a shared/integrated processor subsystem 130 is performed using common algorithms, code, and/or stored instructions, thereby enabling enhanced optimization and decreasing feedback/reaction times when compared with conventional aircraft systems. In various embodiments, the processor subsystem 130 improves coordination between the subsystems 110, 120 because inputs/outputs used in both the engine control subsystem 110 and the flight control subsystem 120 coexist in the integrated processor subsystem 130, thereby enabling the overall operation and performance of the aircraft 10 to be improved. In various embodiments, the phrase "controlling the engine control subsystem" (or controlling channels thereof) refers to manipulating one or more actuators to affect a change in the operating condition of one of the gas turbine engines 11, 12 while the phrase "controlling the flight control subsystems" (or controlling channels thereof) refers to manipulating one or more actuators to affect a change in the flight conditions of the aircraft 10, such as changing the position and/or orientation of flaps, slats, or other control surfaces of the aircraft 10.

Figure 2:
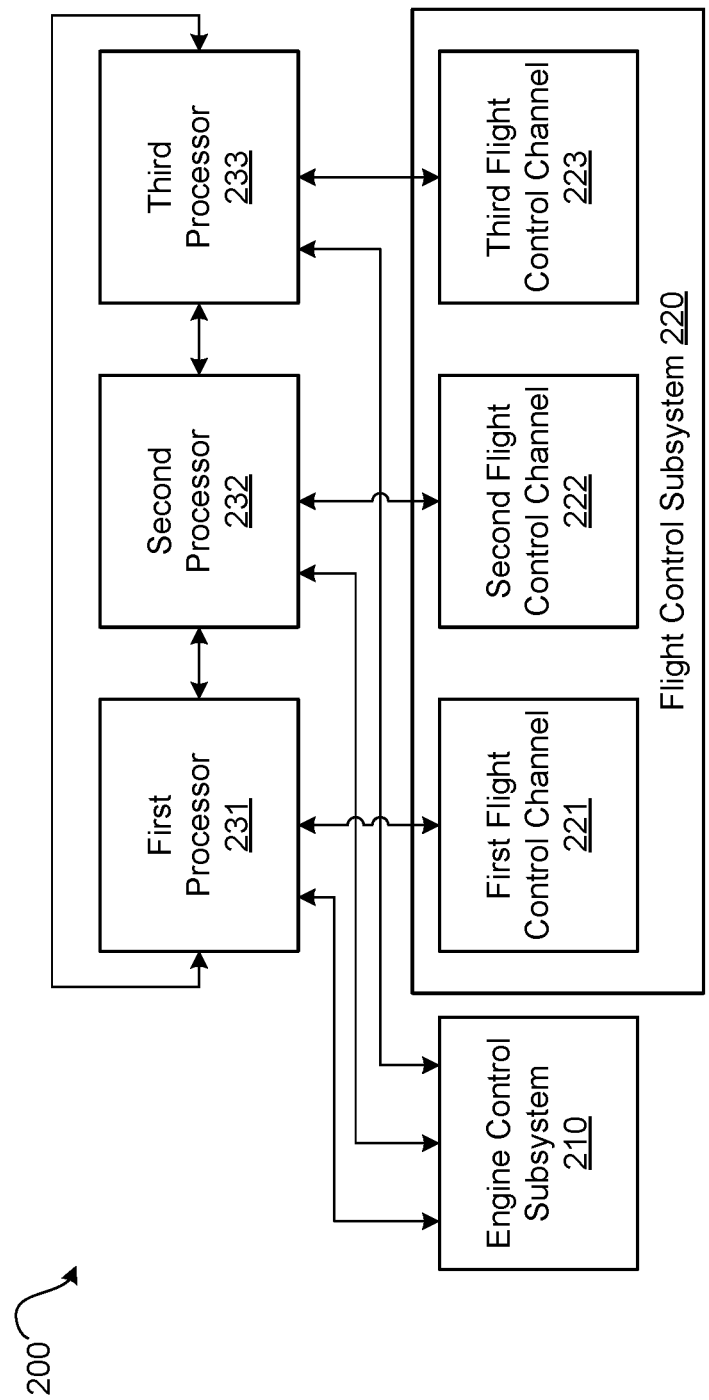
FIG. 2 is a schematic block diagram of an aircraft control system with three processors directly interlinked with each other and linked to three channels of a flight control subsystem, in accordance with various embodiments.

In various embodiments, and with reference to FIG. 2, the aircraft control system 200 is generally configured to have multiple redundancies to ensure operation of the aircraft 10 in the event of component failure. For example, the processor subsystem may have redundant processors 231, 232, 233 that allow for both the engine control subsystem 210 and the flight control subsystem 220 to be controlled in the event that one of the processors 231, 232, 233 fails. In various embodiments, the processor subsystem of the aircraft control system 200 includes a first processor 231, a second processor 232, and a third processor 233. In various embodiments, the first processor 231, the second processor 232, and the third processor 233 are directly interlinked. For example, the first processor 231 may be directly linked to the second processor 232 and directly linked to the third processor 233, while the second processor 232 is also directly linked to the third processor 233. As used herein, the term "directly linked" may refer to direct point-to-point contact or may refer to components being in physical, electronic communication.

In various embodiments, each processor 231, 232, 233 has or is configured to communicate with a respective tangible, non-transitory memory ("memory"). That is, the first processor 231 may have or be in communication with a first memory, the second processor 232 may have or be in communication with a second memory, and the third processor 233 may have or be in communication with a third memory. Each of the respective memories may have instructions stored thereon that, in response to execution by a respective processor, causes the aircraft control system 200 to control both the engine control subsystem 210 and the flight control subsystem 220.

In various embodiments, and with continued reference to FIG. 2, the flight control subsystem 220 includes multiple, redundant channels. That is, the flight control subsystem 220 may include a first flight control channel 221, a second flight control channel 222, and a third flight control channel 223. As mentioned above, this type of redundancy of flight control channels enables the flight of the aircraft to be maintained in the event of one or some of the flight control channels fail. In various embodiments, the first flight control channel 221 is directly linked to the first processor 231, the second flight control channel 222 is directly linked to the second processor 232, and the third flight control channel 223 is directly linked to the third processor 233. In various embodiments, the engine control subsystem 210 is directly linked to each of the first processor 231, the second processor 232, and the third processor 233.

Figure 3:
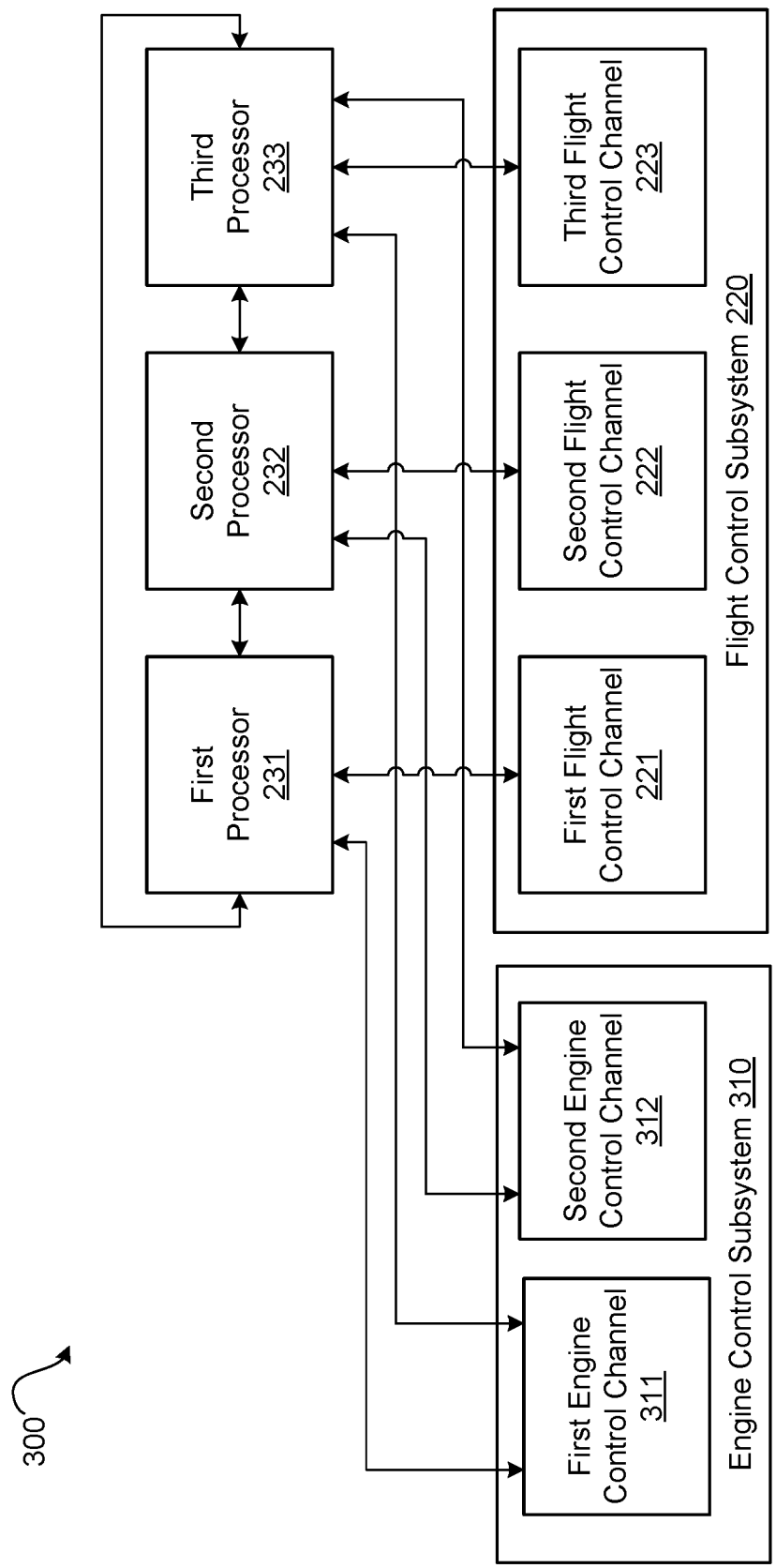
FIG. 3 is a schematic block diagram of an aircraft control system with an engine control subsystem having two channels, in accordance with various embodiments.

In various embodiments, and with reference to FIG. 3, the engine control subsystem 310 includes multiple, redundant channels. That is, the engine control subsystem 310 may include a first engine control channel 311 and a second engine control channel 312. This redundancy of engine control channels enables operation and control of the engine to be maintained in the event that one of the two channels fails. In various embodiments, the engine control subsystem 310 is coupled to the first engine 11 (with reference to FIG. 1). In various embodiments, the engine control channels 311, 312 are each directly linked to two of the three processors 231, 232, 233. For example, the first engine control channel 311 may be directly linked to a first set of two of the first processor 231, the second processor 232, and the third processor 233 and the second engine control channel 312 is directly linked to a second set of two of the first processor 231, the second processor 232, and the third processor 233.

In various embodiments, the first set of processors is directly linked to the first engine control channel 311 (e.g., the first processor 231 and the third processor 232) is different than the second set of processors directly linked to the second engine control channel 312 (e.g., the second processor 232 and the third processor 233). For example, the first processor 231 may be directly linked to the first flight control channel 221 and the first engine control channel 311, the second processor 232 may be directly linked to the second flight control channel 222 and the second engine control channel 312, and the third processor 233 may be directly linked to the third flight control channel 223, the first engine control channel 311, and the second engine control channel 312. In various embodiments, the processors 231, 232, 233 are all directly interlinked with each other. In various embodiments, as long as a single processor, a single engine control channel, and a single flight control channel are operational (i.e., have not failed), the aircraft control system 300 is operational.

Figure 4:
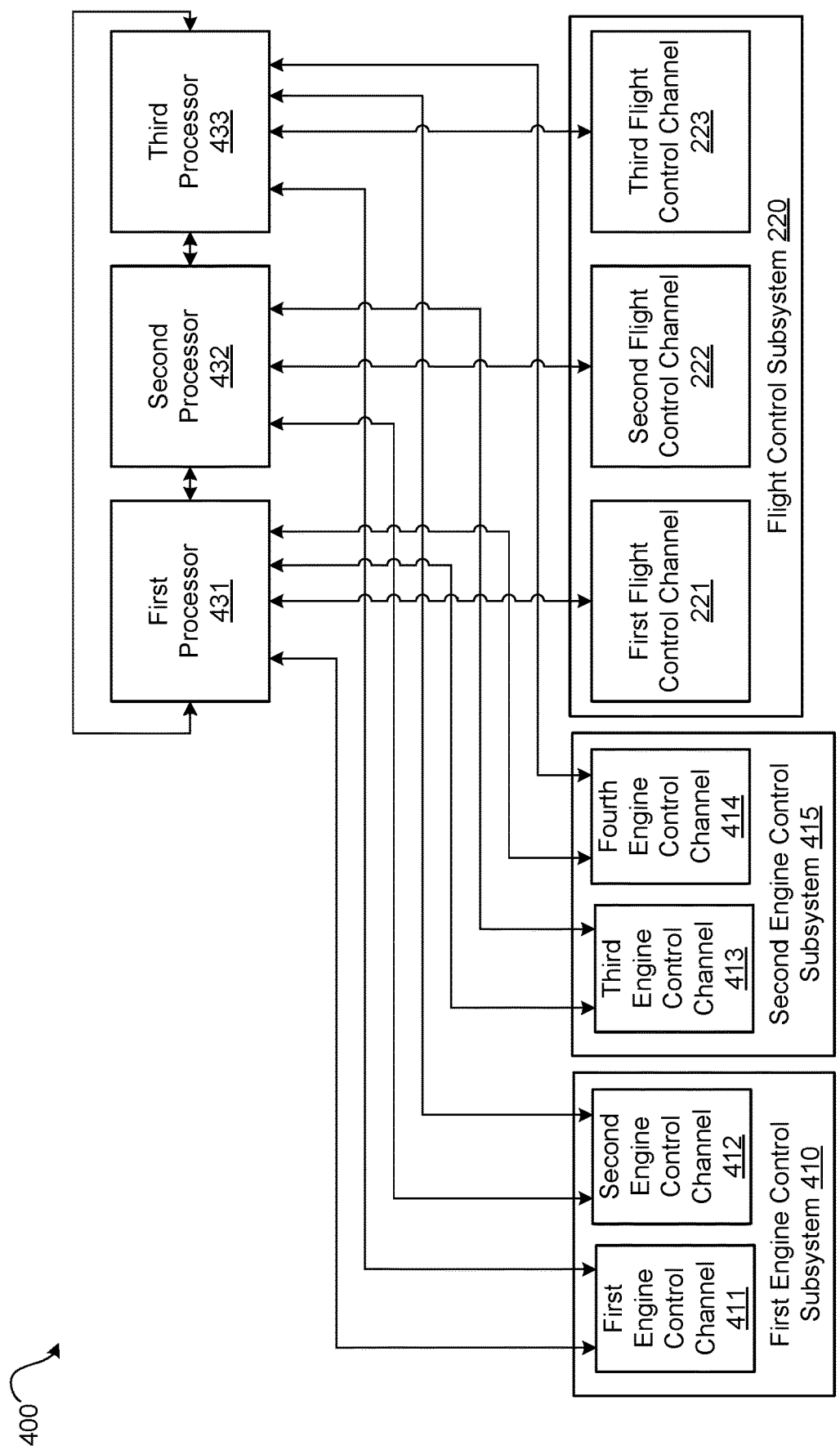
FIG. 4 is a schematic block diagram of an aircraft control system with two engine control subsystems each having two channels, in accordance with various embodiments.

In various embodiments, and with reference to FIG. 4, the aircraft control system 400 includes multiple engine control subsystems 410, 415, each having multiple engine control channels. For example, the first engine control subsystem 410 may include a first engine control channel 411 and a second engine control channel 412 while the second engine control subsystem 415 may include a third engine control channel 413 and a fourth engine control channel 414. In various embodiments, the third engine control channel 413 is directly linked to a third set of two of the first processor 431, the second processor 432, and the third processor 433 and the fourth engine control channel 414 is directly linked to a fourth set of two of the first processor 431, the second processor 432, and the third processor 433.

In various embodiments, and with continued reference to FIG. 4, the third set of processors is directly linked to the third engine control channel 413 (e.g., the first processor 431 and the second processor 432) is different than the fourth set of processors directly linked to the fourth engine control channel 414 (e.g., the first processor 431 and the third processor 433). For example, the first processor 431 may be directly linked to the first flight control channel 221, the first engine control channel 411, the third engine control channel 413, and the fourth engine control channel 414, the second processor 432 may be directly linked to the second flight control channel 222, the second engine control channel 412, and the third engine control channel 413, and the third processor 432 may be directly linked to the third flight control channel 223, the first engine control channel 411, the second engine control channel 412, and the fourth engine control channel 414. In various embodiments, the processors 431, 432, 433 are all directly interlinked with each other. In various embodiments, as long as a single processor, a single engine control channel, and a single flight control channel are operational (i.e., have not failed), the aircraft control system 400 is operational.

Figure 5:
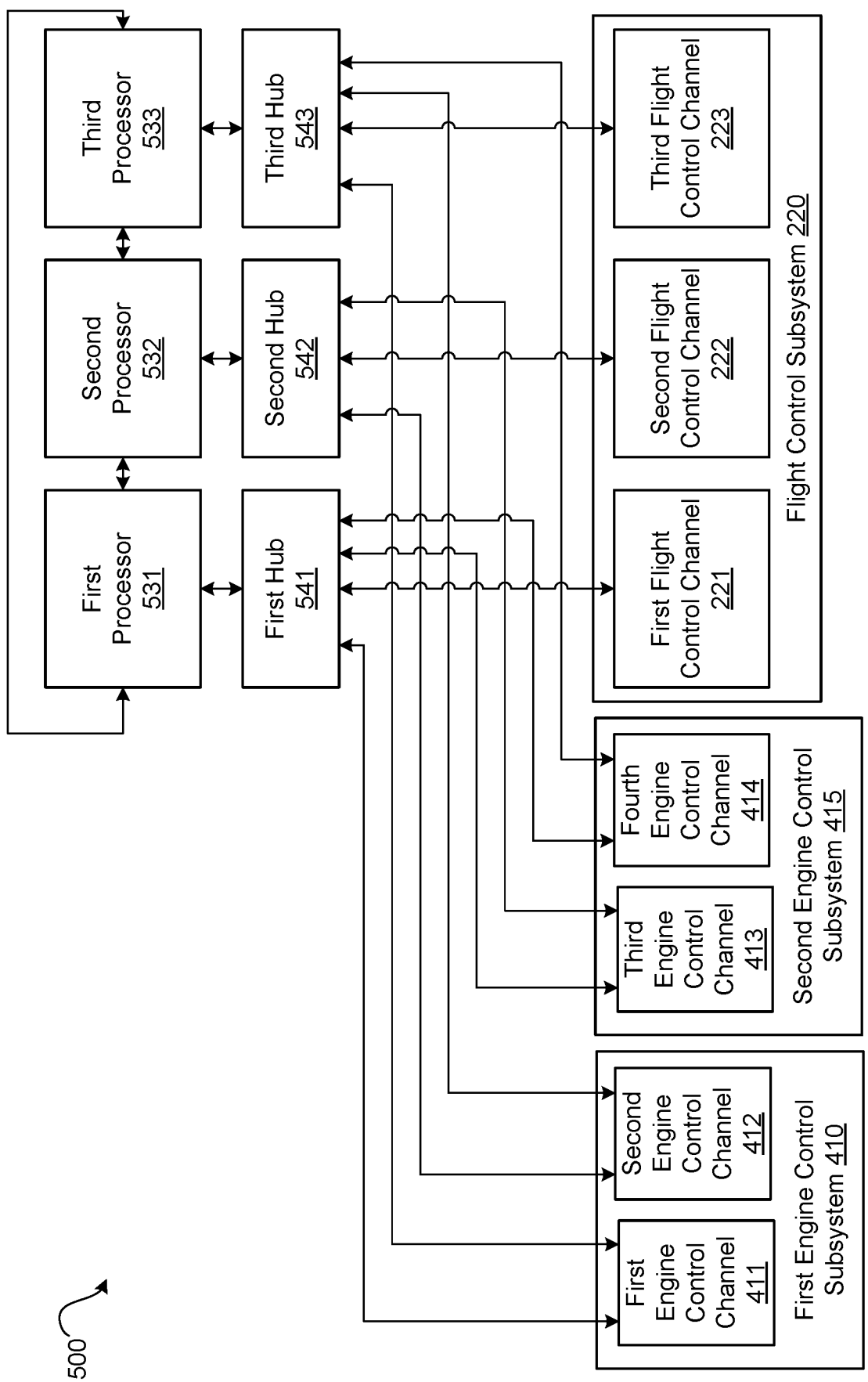
FIG. 5 is a schematic block diagram of an aircraft control system with three hubs disposed between three processors and the flight control subsystem and engine control subsystems, in accordance with various embodiments.

In various embodiments, and with reference to FIG. 5, the aircraft control system 500 includes a plurality of hubs 541, 542, 543 disposed between the processors 531, 532, 533 and the subsystems 410, 415, 220. For example, the first processor 531 may be linked to the first engine control subsystem 410, the second engine control subsystem 415, and the flight control subsystem 220 via a first hub 541, the second processor 532 may be linked to the first engine control subsystem 410, the second engine control subsystem 415, and the flight control subsystem 220 via a second hub 542, and the third processor 533 may be linked to the first engine control subsystem 410, the second engine control subsystem 415, and the flight control subsystem 220 via a third hub 543. The hubs 541, 542, 543 may provide networked capability to the aircraft control system 500 and may provide security and improve message routing efficiency between the processors 531, 532, 533 and the channels of the control subsystems 410, 415, 220. For example, the hubs 541, 542, 543 of the aircraft control system 500 may use a deterministic protocol and may route commands and controls to the channels of the control subsystems 410, 415, 220. In various embodiments, the first processor 531, the second processor 532, and the third processor 533 are directly interlinked with each other.

Figure 6:
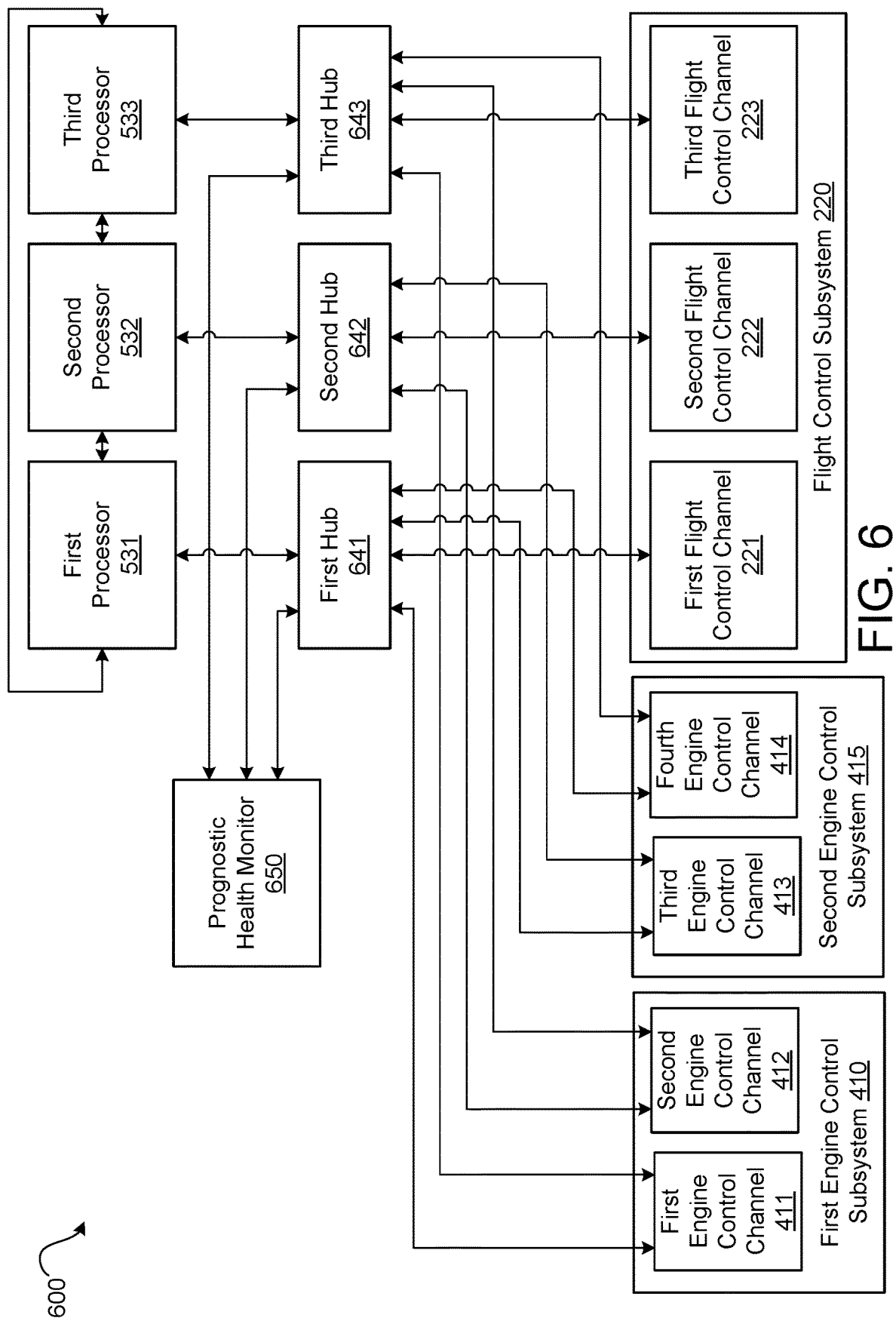
FIG. 6 is a schematic block diagram of an aircraft control system having a prognostic health monitor, in accordance with various embodiments.

In various embodiments, and with reference to FIG. 6, the aircraft control system 600 may further include a prognostic health monitor 650. The prognostic health monitor 650 may be configured to monitor and report the health of the various components of the aircraft control system 600. In various embodiments, the prognostic health monitor 650 may be a type of line replaceable unit ("LRU"), or may be any other system configured to proactively monitor the ability of structures, systems, and components of the aircraft to withstand structural, thermal, and/or chemical loadings over their planned service lifespan. In various embodiments, the prognostic health monitor 650 may be directly linked to the first hub 641, the second hub 642, and the third hub 643, and may be configured to determine if a failure has occurred in one of the processors 531, 532, 533 or one of the control channels of the control subsystems 410, 415, 220. If a failure is determined, integrated control operation of the aircraft may continue with the one or more operating processors 531, 532, 533 and operating control channels of the control subsystems 410, 415, 220.

Figure 7:
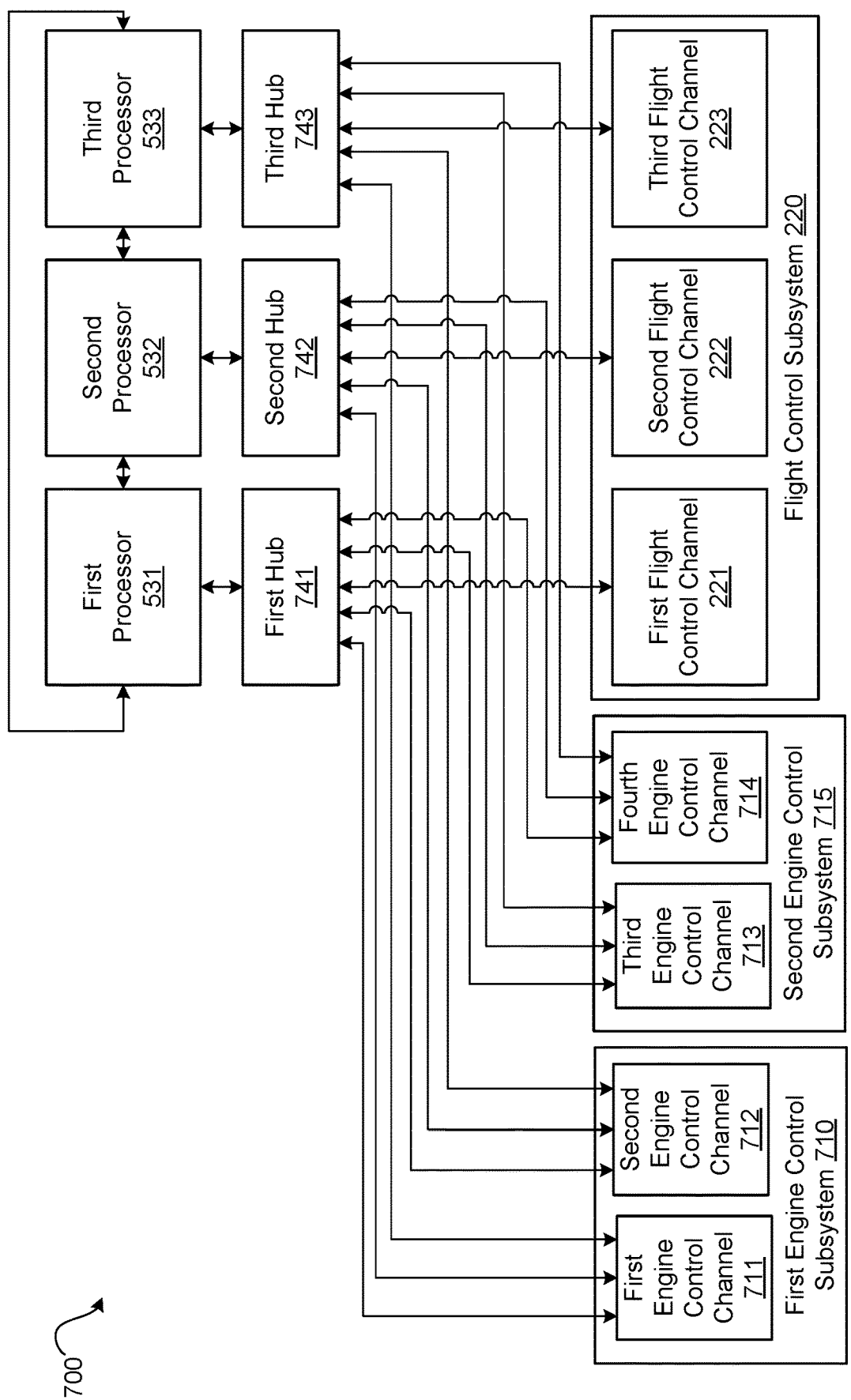
FIG. 7 is a schematic block diagram of an aircraft control system with each channel of each engine control subsystem being directly linked to each processor via respective hubs, in accordance with various embodiments.

In various embodiments, and with reference to FIG. 7, each engine control channel 711, 712, 713, 714 of the engine control subsystems 710, 715 of the aircraft control system 700 is directly linked to each of the processors 741, 742, 743. Said differently, each of the first engine control channel 711, the second engine control channel 712, the third engine control channel 713, and the fourth engine control channel 714 is directly linked to each of the first processor 531, the second processor 532, and the third processor 533. In various embodiments, each of the first engine control channel 711, the second engine control channel 712, the third engine control channel 713, and the fourth engine control channel 714 is directly linked to each of the first hub 741, the second hub 742, and the third hub 743.

Figure 8:
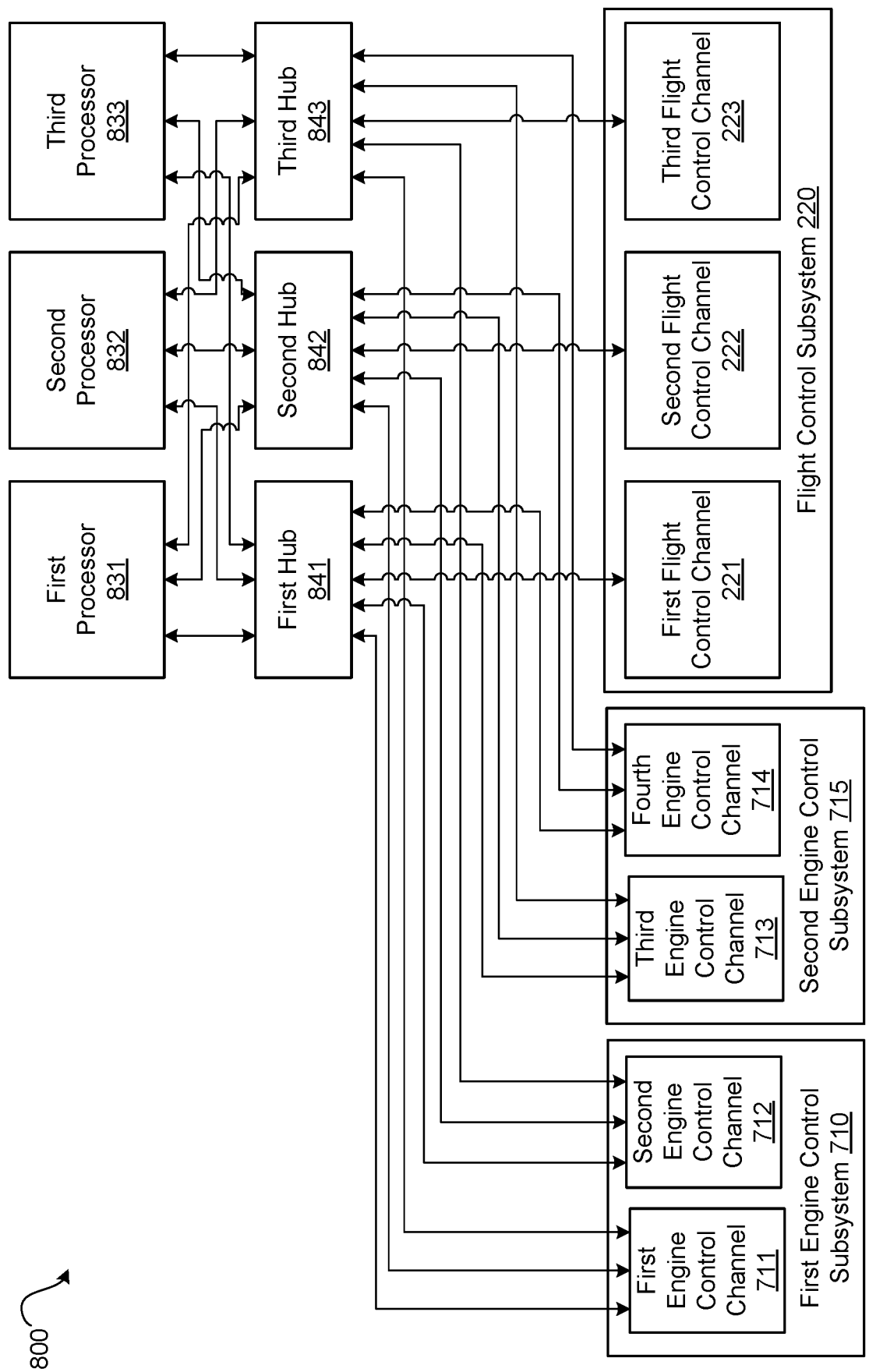
FIG. 8 is a schematic block diagram of an aircraft control system with each processor being directly linked to each hub, in accordance with various embodiments.

In various embodiments, and with reference to FIG. 8, instead of the processors being directly interlinked together, the processors 831, 832, 833 are each directly interlinked with each hub 841, 842, 843. That is, the first processor 831 may be directly linked to the first hub 841, the second hub 842, and the third hub 843, the second processor 832 may be directly linked to the first hub 841, the second hub 842, and the third hub 843, and the third processor 833 may be directly linked to the first hub 841, the second hub 842, and the third hub 843.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft control system for an aircraft comprising at least one gas turbine engine, the aircraft control system comprising:

an engine control subsystem for the at least one gas turbine engine, the engine control subsystem comprising at least one of one or more engine actuator control electronics, one or more engine remote inputs, one or more engine remote outputs;

a flight control subsystem comprising at least one of one or more flight actuator control electronics, one or more flight remote inputs, one or more flight remote outputs;

a processor subsystem, wherein one or more of the engine remote inputs, one or more of the engine remote outputs, one or more of the flight remote inputs, and one or more of the fight remote outputs coexist in the processor subsystem; and a tangible, non-transitory memory configured to communicate with the processor subsystem, the tangible, non-transitory memory having a set of instructions stored thereon that, in response to execution by the processor subsystem, cause the aircraft control system to perform operations comprising:

controlling, by the processor subsystem, one or more engine actuators of the engine control subsystem to affect change in an operating condition of the at least one gas turbine engine; and controlling, by the processor subsystem, one or more flight actuators of the flight control subsystem to control a position or an orientation of at least one of a flap, a slat, or a control surface of the aircraft;

wherein the set of instructions stored on the tangible, non-transitory memory controls both the engine control subsystem and the flight control subsystem.

2. The aircraft control system of claim 1, wherein processor subsystem is a shared/integrated processor subsystem configured to control both the engine control subsystem and the flight control subsystem.

3. The aircraft control system of claim 1, wherein the processor subsystem comprises a first processor, a second processor, and a third processor, wherein the first processor, the second processor, and the third processor are directly interlinked.

4. The aircraft control system of claim 3, wherein the first processor is directly linked to the second processor and directly linked to the third processor and wherein the second processor is directly linked to the third processor.

5. The aircraft control system of claim 3, wherein the tangible, non-transitory memory is a first tangible, non-transitory memory ("first memory"), wherein the aircraft control system further comprises a second tangible, non-transitory memory ("second memory"), and a third tangible, non-transitory memory ("third memory"), wherein each of the first memory, the second memory, and the third memory is configured to communicate with a respective processor of the first processor, the second processor, and the third processor, the first memory, the second memory, and the third memory each having the set of instructions stored thereon that, in response to execution by the respective processor, cause the aircraft control system to perform operations comprising:

controlling, by the respective processor, the engine control subsystem; and controlling, by the respective processor, the flight control subsystem.

6. The aircraft control system of claim 5, wherein the flight control subsystem comprises a first flight control channel, a second flight control channel, and a third flight control channel, wherein the first flight control channel is directly linked to the first processor, the second flight control channel is directly linked to the second processor, and the third flight control channel is directly linked to the third processor.

7. The aircraft control system of claim 6, wherein the engine control subsystem is directly linked to each of the first processor, the second processor, and the third processor.

8. The aircraft control system of claim 7, wherein the engine control subsystem is coupled to a first engine and comprises a first engine control channel and a second engine control channel, wherein the first engine control channel is directly linked to a first set of two of the first processor, the second processor, and the third processor and the second engine control channel is directly linked to a second set of two of the first processor, the second processor, and the third processor, wherein the first set is different than the second set.

9. The aircraft control system of claim 8, wherein the engine control subsystem is a first engine control subsystem, wherein the aircraft control system further comprises a second engine control subsystem coupled to a second engine, wherein the second engine control subsystem comprises a third engine control channel and a fourth engine control channel, wherein the third engine control channel is directly linked to a third set of two of the first processor, the second processor, and the third processor and the fourth engine control channel is directly linked to a fourth set of two of the first processor, the second processor, and the third processor, wherein the third set is different than the fourth set.

10. The aircraft control system of claim 9, wherein the each of the first engine control channel, the second engine control channel, the third engine control channel, and the fourth engine control channel is directly linked to each of the first processor, the second processor, and the third processor.

11. The aircraft control system of claim 9, further comprising a prognostic health monitor configured to monitor and report health of components of the aircraft control system.

12. The aircraft control system of claim 1, wherein the aircraft is a manned aircraft.

13. An aircraft comprising:

a first gas turbine engine and a second gas turbine engine;

a first engine control subsystem coupled to the first gas turbine engine and comprising a first engine control channel and a second engine control channel;

a second engine control subsystem coupled to the second gas turbine engine and comprising a third engine control channel and a fourth engine control channel, wherein the first engine control subsystem and the second engine control subsystem comprise at least one of one or more engine actuator control electronics, one or more engine remote inputs, one or more engine remote outputs;

a flight control subsystem comprising a first flight control channel and second flight control channel, wherein the flight control subsystem comprises at least one of one or more flight actuator control electronics, one or more flight remote inputs, one or more flight remote outputs;

a first processor, a second processor, and a third processor, wherein the first processor, the second processor, and the third processor are directly interlinked, and wherein one or more inputs used in at least one of the first engine control subsystem and the second gas turbine engine, one or more outputs used in the least one of the first engine control subsystem and the second engine control subsystem, one or more inputs used in the flight control subsystem, and one or more outputs used in the flight control subsystem coexist in each of the first processor, the second processor, and the third processor; and a first tangible, non-transitory memory ("first memory"), a second tangible, non-transitory memory ("second memory"), and a third tangible, non-transitory memory ("third memory"), wherein each of the first memory, the second memory, and the third memory is configured to communicate with a respective processor of the first processor, the second processor, and the third processor, the first memory, the second memory, and the third memory each having a set of instructions stored thereon that, in response to execution by the respective processor, cause the respective processor to perform operations comprising:

controlling, by the respective processor, one or more engine actuators of at least one of the first engine control subsystem and the second engine control subsystem to affect change in an operating condition of the respective gas turbine engine; and controlling, by the respective processor, one or more flight actuators of the flight control subsystem to control a position or an orientation of at least one of a flap, a slat, or a control surface of the aircraft;

wherein the set of instructions controls the first engine control subsystem, the second engine control subsystem, and the flight control subsystem.

14. The aircraft of claim 13, wherein the first processor is directly linked to the second processor and directly linked to the third processor and wherein the second processor is directly linked to the third processor.

15. An aircraft control system comprising:

a first engine control subsystem for a first gas turbine engine, the first engine control subsystem comprising a first engine control channel and a second engine control channel;

a second engine control subsystem for a second gas turbine engine, the second engine control subsystem comprising a third engine control channel and a fourth engine control channel;

a flight control subsystem comprising a first flight control channel, a second flight control channel, and a third flight control channel;

a first processor, a second processor, and a third processor; and a first tangible, non-transitory memory ("first memory"), a second tangible, non-transitory memory ("second memory"), and a third tangible, non-transitory memory ("third memory"), wherein each of the first memory, the second memory, and the third memory is configured to communicate with a respective processor of the first processor, the second processor, and the third processor, the first memory, the second memory, and the third memory each having a set of instructions stored thereon that, in response to execution by the respective processor, cause the aircraft control system to perform operations comprising:
- controlling, by the respective processor, one or more engine actuators of at least one of the first engine control subsystem and the second engine control subsystem to affect change in an operating condition of the respective gas turbine engine; and
- controlling, by the respective processor, one or more flight actuators of the flight control subsystem to control a position or an orientation of at least one of a flap, a slat, or a control surface;
- wherein the set of instructions comprises common code for controlling the first engine control subsystem, the second engine control subsystem, and the flight control sub system;

wherein the first processor is linked to the first engine control subsystem, the second engine control subsystem, and the flight control subsystem via a first hub, the second processor is linked to the first engine control subsystem, the second engine control subsystem, and the flight control subsystem via a second hub, and the third processor is linked to the first engine control subsystem, the second engine control subsystem, and the flight control subsystem via a third hub; and wherein the first processor, the second processor, and the third processor are interlinked together either directly or via the hubs;

wherein the set of instructions of each of the first memory, the second memory, and the third memory controls both the flight control subsystem and at least one of the first engine control subsystem and the second engine control subsystem.

16. The aircraft control system of claim 15, wherein the first processor, the second processor, and the third processor are directly interlinked.

17. The aircraft control system of claim 15, wherein each of the first processor, the second processor, and the third processor is directly linked to each of the first hub, the second hub, and the third hub.

18. The aircraft control system of claim 15, further comprising a prognostic health monitor configured to monitor and report health of components of the aircraft control system.

* * * * *